United States Patent [19]
Linn et al.

[11] 3,866,733
[45] Feb. 18, 1975

[54] SELF-ADJUSTING RELEASE MECHANISM FOR FRICTION CLUTCHES

[75] Inventors: Donald F. Linn, Manlius; George L. Wishart, North Syracuse, both of N.Y.

[73] Assignee: Lipe-Rollway Corporation, Syracuse, N.Y.

[22] Filed: Nov. 28, 1973

[21] Appl. No.: 419,769

[52] U.S. Cl............................................. 192/111 A
[51] Int. Cl............................................. F16d 13/75
[58] Field of Search...................... 192/111 A, 70.25

[56] References Cited
UNITED STATES PATENTS
2,002,841    5/1935    Tatter.............................. 192/111 A
2,885,049    5/1959    Staadt............................. 192/111 A

*Primary Examiner*—Benjamin W. Wyche
*Attorney, Agent, or Firm*—Bruns & Jenney

[57] ABSTRACT

A self-adjusting release mechanism for disengaging a friction clutch. As wear occurs on the clutch disc facings, repositioning of part of the release mechanism is required for proper operation. The mechanism includes inner and outer sleeves with the outer sleeve engaging the release levers and the inner sleeve carrying the release bearing. In normal operation, the teeth of a plurality of jaws operably connected to the inner sleeve mesh with teeth on the outer sleeve, thereby locking the sleeves together. When the wear on the disc facing reaches a critical point, the jaws are forced to pivot thereby unlocking the jaw teeth from the outer sleeve teeth. The outer sleeve slides forward to a new position and thereby compensates for the wear. The jaws then reestablish their grip on the outer sleeve at the new position preventing further relative axial movement.

5 Claims, 10 Drawing Figures

3,866,733

PATENTED FEB 18 1975

SELF-ADJUSTING RELEASE MECHANISM FOR FRICTION CLUTCHES

BACKGROUND OF THE INVENTION

This invention relates generally to clutch release or throw-out mechanisms, and has particular reference to a novel self-adjusting release mechanism that automatically compensates for friction disc facing wear.

In friction type clutches, the driven disc or discs are disengaged from the driving flywheel and pressure plate by actuation of the release levers which are in turn actuated by axial movement of the release mechanism. Movement of the release mechanism is normally effected by a yoke member connected through a linkage to the clutch pedal of the vehicle. In engaged condition, the clutch driving and driven members are urged into engagement by pressure springs and as wear occurs on the clutch disc facings, these springs move the pressure plate closer to the flywheel.

The inward movement of the pressure plate results in a force which tends to change the normal position of the associated release levers and release mechanism and thereby to change the adjustment required for proper operation. Thus, if the free ends of the levers and the release mechanism move inwardly with the pressure plate, this may cause binding between the release bearing and yoke member or at some other point. If, on the other hand, the release mechanism is held against inward movement, binding may occur between the lever ends and spider portion of the release mechanism.

In the past, periodic manual adjustment of the operating mechanism has been required to compensate for wear. In one type of clutch, this is accomplished by changing the angle of the yoke member. In another type, the release lever spider includes a sleeve threadedly mounted on one end of a second sleeve having the release bearing mounted on its opposite end. This permits relative axial movement between the sleeves whereby the distance between the release lever ends and yoke member can be changed to compensate for wear. A release mechanism having manual adjustment means of this last-mentioned type is disclosed in U.S. Pat. No. 2,863,537 to Root, owned by the assignee of the present invention.

The only prior self-adjusting clutch release mechanism known to the applicants is disclosed in U.S. Pat. No. 3,433,341 to Bohn et al. In this patent, the mechanism includes a collapsible or extendable release bearing carrier with ball bearings retained in an angled cavity of a sleeve member surrounding the carrier, permitting the assembly to controllably collapse or extend to reposition the release bearing with respect to the clutch. This mechanism is more complex that that of the present invention and appears to be considerably more expensive to manufacture.

The applicants herein have earlier filed copending applications. Ser. No. 356,723 filed May 3, 1973 and Ser. No. 399,996 filed Sept. 24, 1973 are applications directed to different modifications of the self-adjusting clutch release mechanism disclosed in the present application.

SUMMARY OF THE INVENTION

The self-adjusting release mechanism disclosed herein includes a first or inner sleeve axially slidable on the driven or output shaft of the clutch and carrying the release bearing at one end. An outer sleeve, called a spider, is mounted for axial sliding movement adjacent the other end of the inner sleeve, the spider carrying lugs engageable with the ends of the release levers for actuating same. The two sleeves are normally connected together to prevent relative axial movement by teeth on the spider and engaging teeth on jaws connected to the inner sleeve.

When the wear on the clutch disc facing reaches a critical point, ramps on a rigid unlocking ring force the jaws to pivot thereby unlocking the jaw teeth from the spider teeth. The spider is free to seek a new position to compensate for the wear on the disc facing. The jaw teeth then reestablish their grip on the spider teeth at their new position when the clutch release mechanism is next actuated.

BRIEF DESCRIPTION OF THE DRAWINGS

FIG. 10. is a rear elevation of the return spring.

DESCRIPTION OF THE PREFERRED EMBODIMENT

Figure 1:
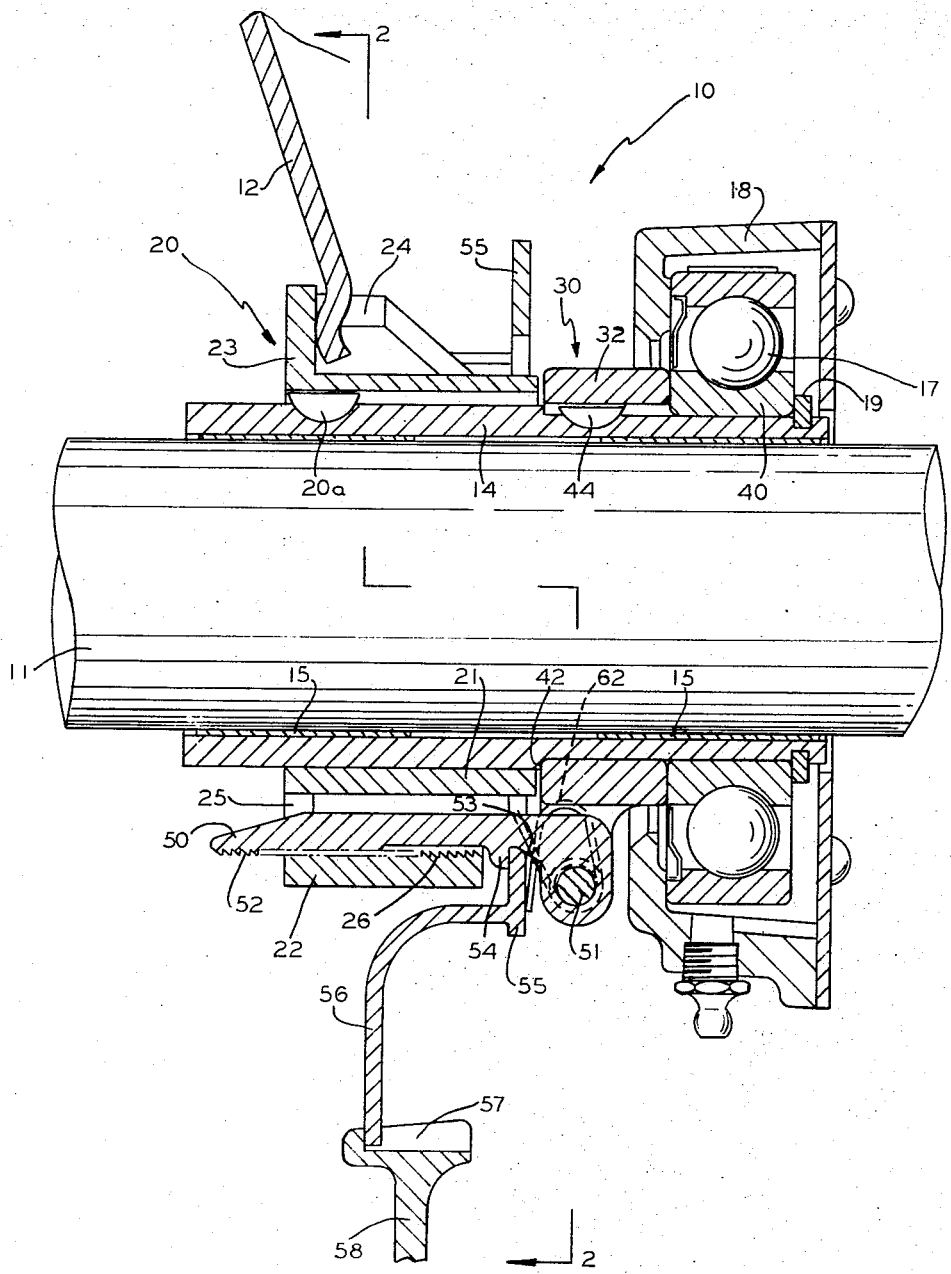
FIG. 1 is a vertical section through the clutch release mechanism of the invention.

Referring now to the drawings, the release mechanism that is shown forms a part of an otherwise conventional friction clutch such as that disclosed in Root u.S. Pat. No. 2,863,537, cited above. Accordingly, reference may be had to the Root patent for a description of the function and operation of the conventional clutch components, including the driven discs on the facings of which wear occurs.

The release mechanism, generally indicated at 10, is mounted for axial sliding movement on the driven or output shaft 11 and the inner (forward) end of the mechanism is in engagement with release levers 12 for actuation of same. The mechanism shown is for a pull type clutch meaning that it must be moved rearwardly or to the right in FIG. 1 to disengage the clutch. Such movement operates through the release levers to move the pressure plate (not shown) rearwardly and causes the driving connection between the driving and driven members to be disengaged.

Release member 10 includes a first or inner sleeve 14 separated from the driven shaft by a pair of bushings 15. Mounted on the rear end of sleeve 14 is a release bearing 17 including the bearing housing 18. The inner race of the bearing is retained on the sleeve by retaining ring 19.

Figure 3:
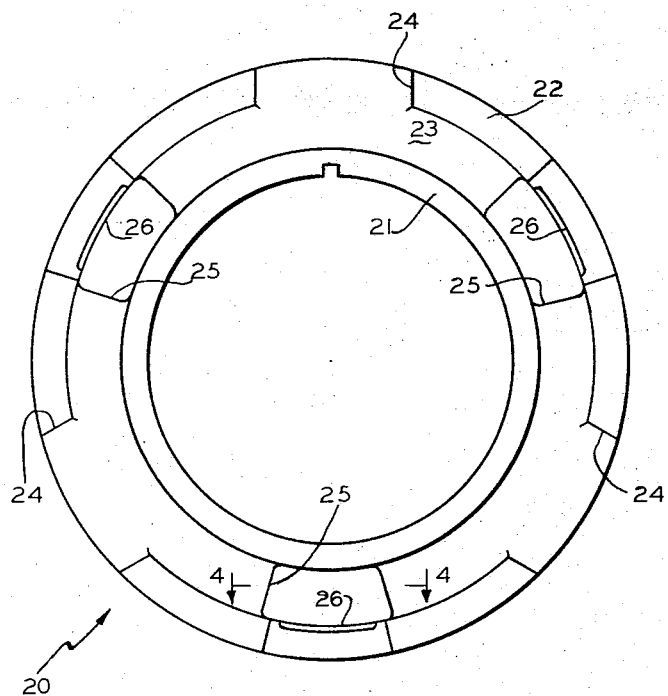
FIG. 3 is a rear elevation of the spider.

A release lever spider 20 is slidably mounted on sleeve 14 adjacent its forward end and is prevented from rotating relative to the sleeve by a key 20a. The spider is comprised of a sleeve 21, an outer concentric cylinder 22 dimensioned to create an annular space between said members and means for connecting same. FIG. 3 shows the spider as a single casting wherein the sleeve 21 and outer cylinder 22 are joined by a wall 23 perpendicular to both members.

Figure 4:
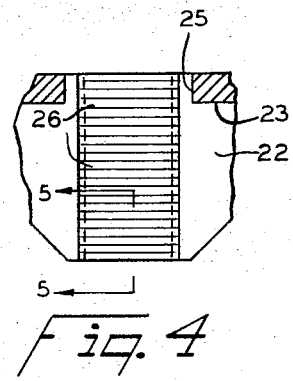
FIG. 4 is a top view of the teeth of the spider taken on line 4—4 of FIG. 3.
Figure 5:
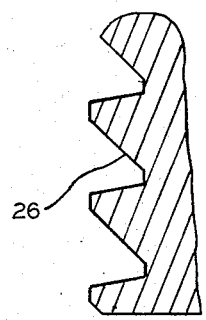
FIG. 5 is an enlarged section through the spider teeth taken on line 5—5 of FIG. 4.

Cylinder 22 has a plurality of circumferentially spaced cutaway portions 24 for receiving the inner ends of the release levers 12. The connecting wall 23 has a plurality of circumferentially spaced apertures 25, FIG. 3. Registering with said apertures, in the inner surface of the outer cylinder 22, are a row of teeth 26 as shown in FIG. 4. These teeth are of a buttress thread profile, FIG. 5, for withstanding the pull (to be described) of the release mechanism.

Figure 6:
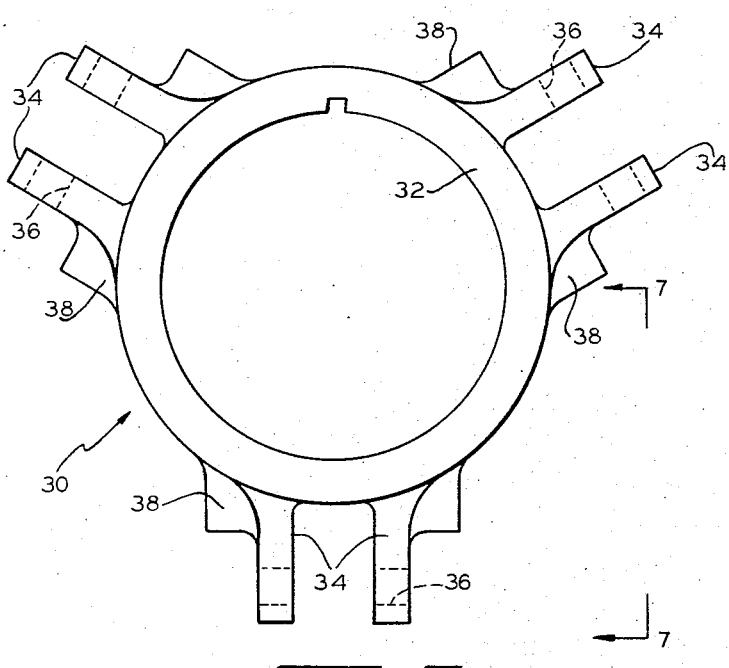
FIG. 6 is a rear elevation of the pivot ring.
Figure 7:
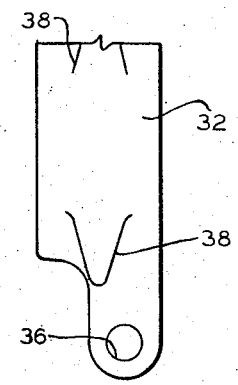
FIG. 7 is a fragmentary side elevation of the pivot ring.

A pivot ring 30, FIGS. 6 and 7, is comprised of a ring 32 and a plurality of pairs of parallel fingers 34 projecting radially outward from said ring, each finger having a bore 36 aligned with a corresponding bore in its mate. On the base of each finger is a wedge shaped lug 38 extending perpendicularly to the face of said member.

The pivot ring 30 is mounted on inner sleeve 14 and is axially restrained by inner race 40 of the release bearing and a shoulder 42 on inner sleeve 14. Relative rotational movement is prevented by key 44.

Figure 8:
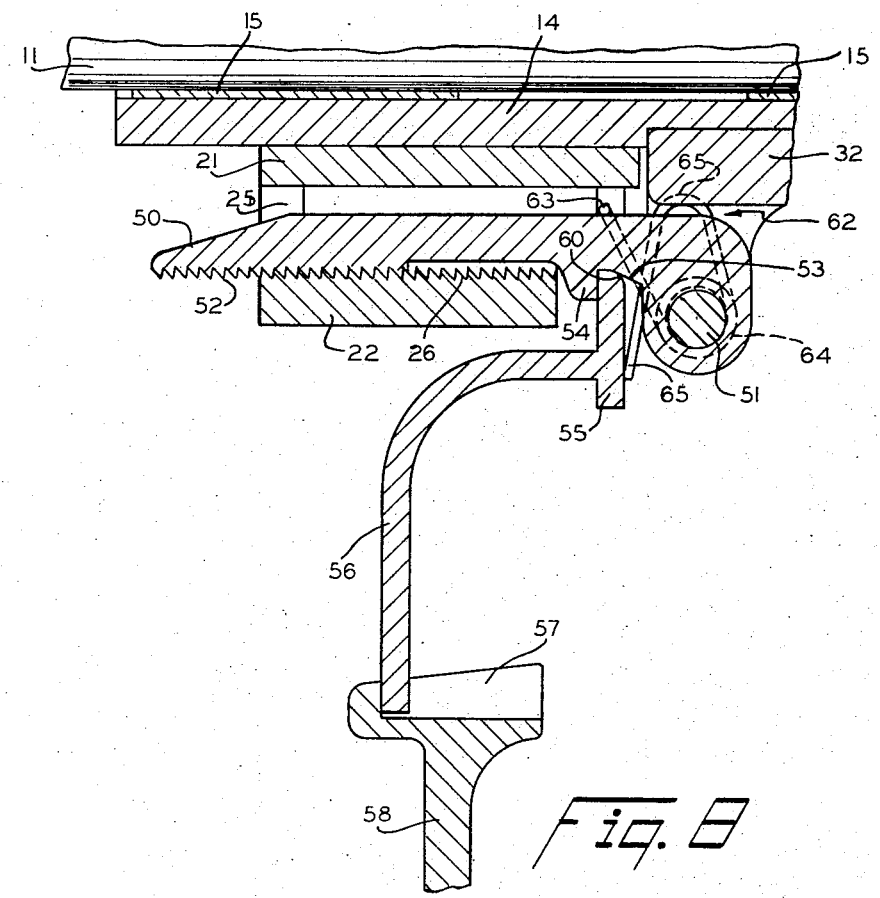
FIG. 8 is an enlarged vertical section of the wear adjustment portion of the clutch.

Between each pair of pivot ring fingers 34 is a jaw 50, secured in position by a pivot pin 51 passing through the finger bores and said jaw as best seen in FIG. 8. A row of teeth 52 of a profile for meshing with the teeth 26 of spider 20, form the lower surface of the forward end of the jaw. Towards the rear of the jaw is a cam surface 53, the function of which will be described later.

Figure 9:
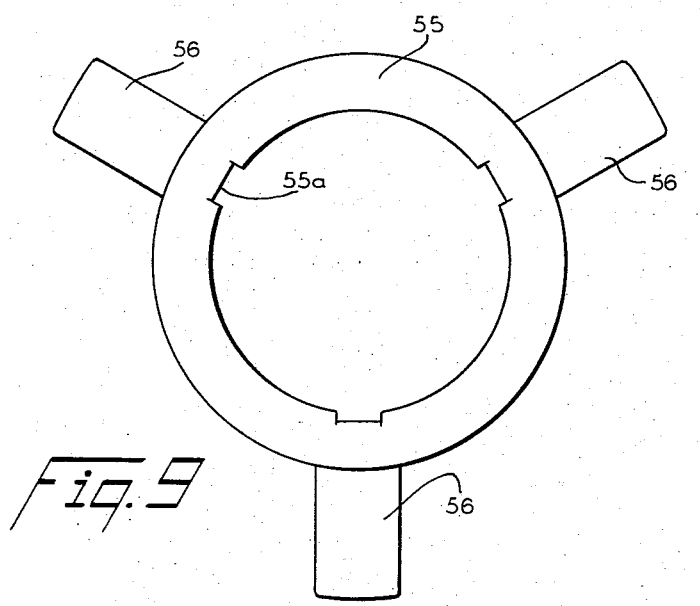
FIG. 9 is a rear elevation of the unlocking ring.

Each of the jaws 50 is formed with a transverse projection 54, and these projections are normally engaged by an unlocking ring 55, FIG. 9, the ring having cutouts 55a in which the jaws are received. From said ring three circumferentially spaced arms 56 project radially outward. The arms are bent, as shown in FIG. 1, to position their outer ends within complementary slots 57 in clutch cover 58. Axial movement of these arms is permitted but rotational movement is prevented by the walls of the slots. When the clutch is engaged the ends of these arms abut against the back walls of the slots prohibiting the release mechanism 10 from further forward axial movement.

The cutouts 55a in the inner edge of the retaining ring are bevelled to form ramps or cam surfaces 60 corresponding to the cam surfaces 53 on the underside of the jaws, as best seen in FIG. 8.

Figure 2:
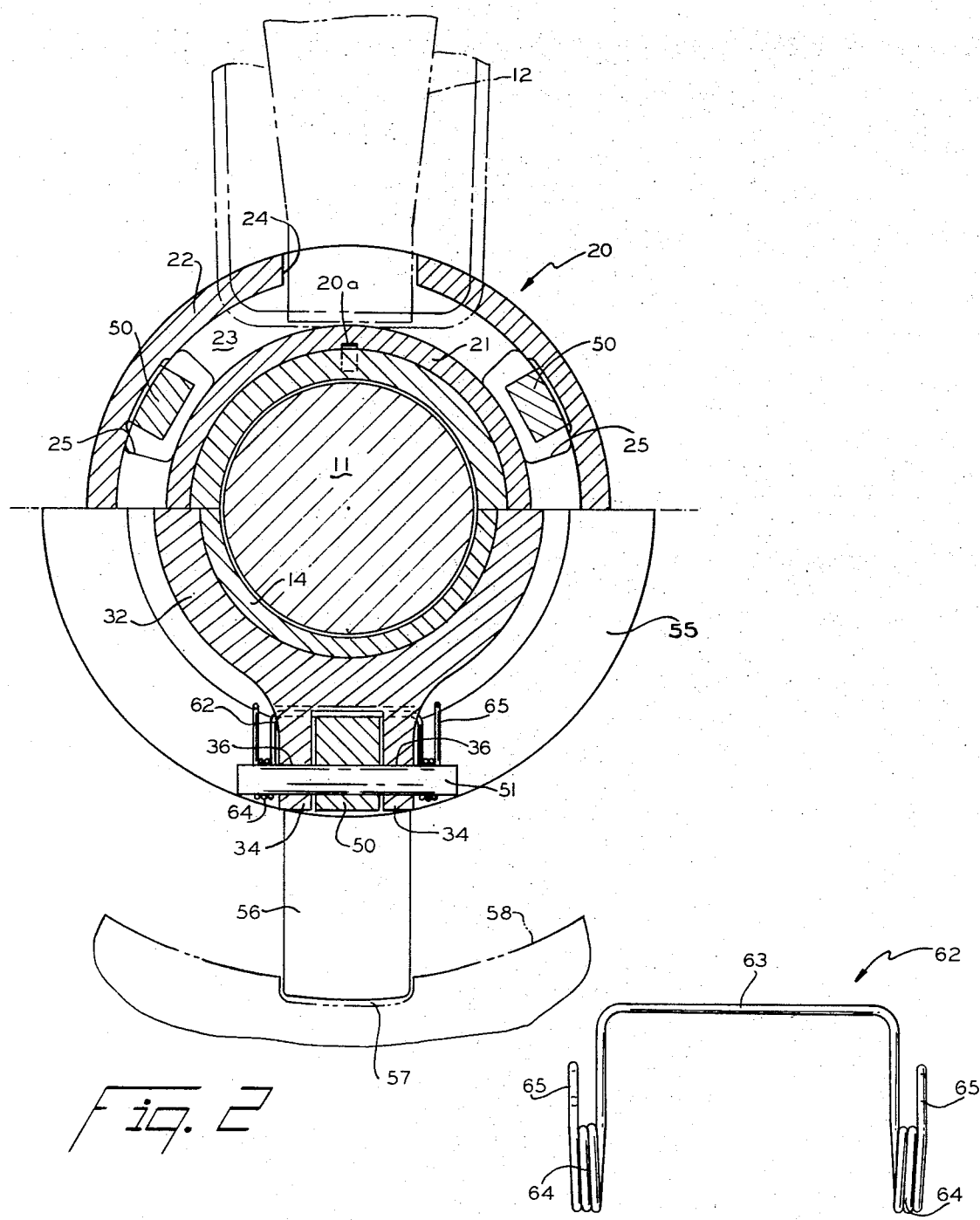
FIG. 2 is a transverse section through the mechanism taken on line 2—2 of FIG. 1.

Associated with each jaw 50 is a return spring 62, FIG. 10, formed by a wire 63 that spans the top of the jaw and extends past the pivot ring fingers 34, FIG. 2, then turns downward at right angles and terminates on each side in a coil 64 positioned over the protruding ends of pivot pin 51. At the outer end of each coil 64 is an inverted U-shaped spring extension 65. In its normal condition the top span of this return spring in conjunction with the side coils biases jaw 50 downwards, while the inverted U extensions 65, positioned between stationary pivot ring lugs 38 and unlocking ring 55, bias the unlocking ring against jaw projectings 54.

In normal operation of the release mechanism, without consequential wear on the driven disc facings, disengagement of the clutch is as follows: Release mechanism 10, FIG. 1, is moved to the right or rearward by a clutch pedal actuated yoke (not shown) which engages the release bearing housing 18. The yoke pull is transmitted through the release bearing 17, retaining ring 19 and inner sleeve 14 to pivot ring 30, the ring being engaged by shoulder 42 on the sleeve. The rearward movement of the pivot ring is transmitted through jaws 50 and the meshed buttress teeth 26, 52 to outer cylinder 22 of spider 20 whereby the release levers 12 are actuated to disengage the clutch. From the above description, it can be seen that all members of this release mechanism move as one. When the clutch pedal is released, the released mechanism returns to its starting position in the conventional manner to reengage the clutch.

As wear increases on the disc facings and is no longer inconsequential, the following sequence of events occurs during reengagement of the clutch. When the release levers 12 reach their starting position, the arms 56 of the unlocking ring 55 contact the clutch cover 58 thereby preventing further forward movement of the ring. Due to the wear, however, the pressure plate and attached release levers are able to move further forward towards the flywheel and are strongly urged to do so by the usual pressure springs (not shown) acting on the pressure plate. This causes the free ends of the release levers to continue to urge spider 20 forward beyond its starting position.

The further forward movement of spider 20 is transmitted through meshed buttress teeeth 26, 52 to jaws 50 whereby the cam surfaces 53 of the jaws are pulled forward against the stationary ramps 60. This causes the cam surfaces to start to ride up the ramps and pivot the jaws upward against the bias of return spring 62, the initial pivotal movement of the jaws being so slight that disengagement of the meshed teeth is not effected. As the wear increases each reengagement of the clutch will result in the jaws pivoting higher. When the wear reaches the critical point where adjustment is needed, the teeth of the jaws will pivot out of engagement with the teeth of the spider.

No longer being restrained by the jaws, spider 20 is free to move forward to a new position determined by the pressure plate and release levers. As soon as the spider has moved to its new position, the jaws will again be biased downward by return springs 62 resulting in reengagement of the teeth of the jaws and the spider. With this reengagement the release mechanism will again function as a single element until further adjustment is needed.

From the foregoing description it will be apparent that the invention provides a novel self-adjusting release mechanism that can effectively reduce vehicle down time and maintenance costs. As will be understood by those familiar with the art, the invention may be embodied in other specific forms without departing from the spirit or essential characteristics thereof.

We claim:

1. In a friction clutch for connecting driving and driven shafts, the clutch having means for normally effecting a driving connection between the shafts and release levers actuatable to disengage said driving connection, the improvement comprising an inner sleeve member axially slidable on the driven shaft, an outer sleeve member axially slidable on the inner sleeve, means on one of said sleeve members engageable with the release levers for actuation of same, a jaw having a gripping surface, means to pivotally connect said jaw to one of the sleeves, a gripping surface on the other sleeve which is normally gripped by the jaw whereby axial movement of the one sleeve member in one direction operates to correspondingly move the other sleeve and actuate the release levers, and means for releasing said jaw from said gripping surface, the release means being operable when the wear on the clutch driving connection reaches a particular point to permit relative axial movement between sleeve members to compensate for the wear.

2. A friction clutch as defined in claim 1 wherein the means operable to release the jaw include a member having a ramp surface and normally moveable with the jawed sleeve, said ramp surface member including means to positively limit the extent of its axial movement in one direction.

3. A friction clutch as defined in claim 2 wherein the jaw has a cam surface in engagement with said ramp surface, the ramp member being operable when the driving connection wears to disengage the jaw from the gripping surface of said other sleeve.

4. In a friction clutch for connecting driving and driven shafts, the clutch having means for normally effecting a driving connection between the shafts and release levers actuatable to disengage said driving connection, the improvement comprising an inner sleeve member axially slidable on the driven shaft and an outer sleeve member axially slidable on the inner sleeve, means on the outer sleeve member engageable with the release levers for actuating same, an annular member mounted on said inner sleeve, a jaw pivotally connected to said annular member, said jaw having a gripping surface and a camming surface, a gripping surface on the outer sleeve normally engaged by the gripping surface whereby axial movement of the inner sleeve in one direction operates to correspondingly move the outer sleeve and actuate the release levers, an unlocing ring normally encircling said outer sleeve adjacent said annular member, said unlocking ring having a ramp surface over which the cam surface of the jaw is forced when the wear on the clutch driving connection has reached a particular point whereby the jaw is disengaged from the gripping surface of the outer sleeve to permit relative axial movement between sleeve members to compensate for the wear.

5. A friction clutch defined in claim 4 including a clutch cover and wherein the unlocking ring is limited in its axial movement by members outwardly projecting from said ring and arranged to abut the clutch cover.

* * * * *